No. 785,450.

Patented March 21, 1905.

UNITED STATES PATENT OFFICE.

AUGUST TIXIER, OF BILLANCOURT, AND LUCIEN RAMBAUD, OF PARIS, FRANCE.

PROCESS OF MANUFACTURING VARNISHES.

SPECIFICATION forming part of Letters Patent No. 785,450, dated March 21, 1905.

Application filed September 22, 1903. Serial No. 174,158.

*To all whom it may concern:*

Be it known that we, AUGUST TIXIER, chemist, residing at 160 Rue de Billancourt, Billancourt, Seine, and LUCIEN RAMBAUD, chemist, residing at 14 Rue du Parc Royal, Paris, France, citizens of the Republic of France, have invented a new and Improved Process of Manufacturing Varnishes, of which the following is a specification.

The greater part of the gums cannot be utilized in the manufacture of varnishes except after having been submitted to a fusion which has for its object to render them soluble in oils and other liquids employed in this industry. All efforts hitherto made for obtaining without this preliminary operation varnishes of good quality and easy of employment have been ineffectual. Now this possesses the disadvantages of occasioning an important loss of material, of complicating the work, and of producing products which are more or less colored.

The present invention consists in a process which permits of the preparation by causing an acid to act on spirit of turpentine of a solvent which readily dissolves the gums without previous fusion and which is suitable for the manufacture of alcoholic or spirit varnishes as well as for fatty varnishes. In the case of these latter the process has the advantage of increasing the solubility of the gums in oil. The active principle of this solvent is terpinol $C_{10}H_{18}O$, which exercises a very energetic solvent action on gums in the natural state or incompletely melted, even if a certain quantity of spirit of turpentine, of benzin, of alcohol, &c., is added, (a quantity varying with each gum and with its degree of coction,) which permits of the preparation of a solvent cheaper than pure terpinol and susceptible consequently of real industrial employment. The hard gums themselves for the major part dissolve, leaving a slight mucilaginous residue easy of separation by filtration, provided that the solvent contains the minimum of terpinol necessary, a quantity easy to determine for each case by preparing a solution of gum in terpinol and adding spirits of turpentine or of benzin, &c., until the gum commences to separate therefrom, which is apparent by a persistent clouding of the solution.

The solvent is prepared beginning with the spirit of turpentine by an indirect process.

The process consists in causing moderately-diluted mineral acid to act on the spirit of turpentine with more or less violent agitation.

In putting the process into practice the temperature is maintained low—that is to say, at 15° to 20° centigrade (cooling if needful) during the action of the mineral acid on the spirit. Under these conditions nearly the whole of the latter is transformed into crystallized terpene, which it only remains to wash in pure water and to transform into terpinol by the action of very dilute sulfuric acid. The most convenient mineral acid is nitric acid at about 20° Baumé. Dilute sulfuric or hydrochloric acid may be substituted therefor, but nitric acid was found to give better results. This process produces a colorless product of unvarying composition which may serve as a sure base for uniform productions.

The operation conducted with care, taking into account the delicate conditions of the transformation of the terpinol under the action of chemical agents, permits of the obtaining a very good output, beginning with the spirit of turpentine, of a pure industrial terpinol, without action on the polarized light, of a density bordering on 940 of an index of refraction beyond 1.4780 at 20° centigrade. With such a product the density permits the percentage of pure terpinol to be estimated in a sufficiently approximate manner. This product is then taken for the preparation by its admixture in suitable proportions with the other constituents of the varnish to be manufactured (spirit of turpentine or benzin or alcohol, &c., as the case may be) of the solvent containing the minimum of terpinol necessary, corresponding to the given gum or to the kind of varnish desired.

The following is the method of preparing the varnishes by the process above described. For spirit or alcoholic varnishes it suffices to dissolve the gum, previously finely pulverized, in the solvent above indicated, either under heat or cold, then filtering. Varnishes limpid as crystal and quite as colorless are obtained if the proper pieces of gum have been chosen, which varnishes are very suitable for the interior of habitations. The preparation of fatty varnishes is more delicate on account of the insolubility of the gums in oils. However, the terpinol, of which a part remains combined with the gums, serves as a binding medium between these two constituents. For their manufacture it is necessary to take into account the nature of the gum and this double fact that the quantity of oil that can be added increases with the proportion of terpinol in the solvent and increases also with its acidity, whether this may be produced by the preliminary treatment to which the oil is submitted or directly by addition of soluble fatty acid to the oil. By taking into account these facts the composition of a given fatty varnish may be determined exactly in advance.

The varnishes prepared by this new process, besides the economy and the superiority of the products, offer a great advantage to the manufacturer, seeing that they must be employed just as they are, any attempt at adulteration having for its consequence to induce their immediate decomposition by the separation of gum. It is only those who know the exact composition who can in accordance with given data modify this composition.

What we claim as our invention is—

1. The process of manufacture of a solvent for gums consisting in causing an acid to act on the spirit of turpentine, while agitating, so as to produce crystallized terpene, treating the terpene with dilute sulfuric acid to form terpinol and mixing the terpinol with an ordinary varnish solvent.

2. The process of manufacture of a solvent for gums consisting in causing dilute nitric acid to act on spirit of turpentine at a temperature about 15° to 20° centigrade to transform the major part of the spirit into crystallized terpene, washing the terpene in water, treating the washed terpene with dilute sulfuric acid to form terpinol and mixing the terpinol with an ordinary varnish solvent.

3. The process of manufacturing varnish consisting in obtaining a solvent with a terpinol base by the action of an acid on the spirit of turpentine, dissolving the varnish-gum in this solvent, filtering the solution thus obtained and adding thereto an ordinary varnish solvent.

4. The process of manufacturing fatty varnish consisting in obtaining a solvent with a terpinol base by the action of an acid on the spirit of turpentine, dissolving a varnish-gum in said solvent, filtering the solution thus obtained, then adding thereto oil acidified by means of a fatty acid soluble therein.

In testimony that we claim the foregoing as our own invention we have signed our names, in presence of two witnesses, this 9th day of September, 1903.

AUGUST TIXIER.
LUCIEN RAMBAUD.

Witnesses:
PAUL F. PÂQUET.
ALCIDE FABE.